United States Patent [19]

Sellmeyer

[11] 4,391,159

[45] Jul. 5, 1983

[54] PARKING BRAKE ACTUATING DEVICE

[75] Inventor: Daniel J. Sellmeyer, Royal Oak, Mich.

[73] Assignee: Gulf & Western Manufacturing Company, Southfield, Mich.

[21] Appl. No.: 212,270

[22] Filed: Dec. 3, 1980

[51] Int. Cl.³ ............................................. G05G 1/04
[52] U.S. Cl. ....................................... 74/516; 74/540
[58] Field of Search ................. 74/516, 517, 518, 512, 74/540

[56] References Cited

U.S. PATENT DOCUMENTS

| | | | |
|---|---|---|---|
| 3,034,374 | 5/1962 | Hinsey | 74/534 |
| 3,079,809 | 3/1963 | Fender et al. | 74/542 |
| 3,117,466 | 1/1964 | Hinsey | 74/531 |
| 3,135,133 | 6/1964 | Fender | 74/541 |
| 3,184,992 | 5/1965 | Hinsey et al. | 74/534 |
| 3,188,883 | 6/1965 | Fender | 74/534 |
| 3,236,120 | 2/1966 | Fender | 74/531 |
| 3,236,121 | 2/1966 | Edowik et al. | 74/531 |
| 3,315,538 | 4/1967 | Fender | 74/531 |
| 3,333,512 | 8/1967 | Parsons | 92/140 |
| 3,358,797 | 12/1967 | Walton | 192/4 |
| 3,367,208 | 2/1968 | Fender | 74/531 |
| 3,602,064 | 8/1971 | Francis | 74/512 |
| 3,693,472 | 9/1972 | Hirst, Jr. et al. | 74/518 |
| 3,875,820 | 4/1975 | Morden | 74/516 |
| 3,897,694 | 8/1975 | Hirst, Jr. | 74/516 |
| 3,918,321 | 11/1975 | Hybarger | 74/516 |
| 3,938,407 | 2/1976 | Nisbet | 74/516 |
| 4,353,265 | 10/1982 | Lipshield | 74/501 R |

FOREIGN PATENT DOCUMENTS

| | | | |
|---|---|---|---|
| 2166130 | 3/1973 | Fed. Rep. of Germany | 74/516 |
| 2746386 | 4/1979 | Fed. Rep. of Germany | 74/518 |
| 2746387 | 4/1979 | Fed. Rep. of Germany | 74/518 |
| 489784 | 9/1938 | United Kingdom | 74/516 |

Primary Examiner—Kenneth Dorner
Attorney, Agent, or Firm—Body, Vickers & Daniels

[57] ABSTRACT

A device for pulling upon a parking brake actuating cable in response to movement of a pedal actuated lever in a selected path between a brake release first position and a brake engaging second position wherein the device comprises a motion translating element having first and second mechanical couplings spaced from each other for securing to the lever and to the actuation cable, respectively, mechanism for moving the first mechanical coupling in a selected first path by the pedal lever and a cam coacting with the motion translating element for causing the second mechanical coupling to move in a selected second path controlled jointly by movement of the first coupling and the cam. In this device, the motion translating element is a link and the cam includes a curvilinear surface on the link and a fixed rotary pin against which the cam surface is biased by the pulling force of the cable against the link so that the fulcrum formed by the pin and surface progressively changes as the pedal lever is depressed.

23 Claims, 9 Drawing Figures

PARKING BRAKE ACTUATING DEVICE

The present invention relates to the art of operating the brakes of a motor vehicle and more particularly to a parking brake actuating device for a motor vehicle.

The invention is particularly applicable for actuating the parking brakes of an automobile generally disclosed in U.S. Pat. Nos. 3,079,809; 3,135,133; 3,184,992; 3,236,120; 3,236,121; 3,315,538; and 3,367,208. These patents are incorporated herein for background information.

BACKGROUND OF THE INVENTION

As disclosed in the prior art patents mentioned above, it is common practice to provide a motor vehicle with a parking or emergency brake actuating mechanism which generally involves a foot operated or depressed pedal which is forced downwardly to force the parking brake mechanism from the brake release position to the brake engaging or actuating position. Many mechanical devices have been suggested and employed for converting the pivotal movement of the foot actuated pedal into a pulling action for engaging the parking or emergency brakes of a vehicle. These devices generally include an arrangement for securing the brakes in the actuated position. A manual device is employed which releases the parking or emergency brake mechanism to allow a return to the brake release position. The force exerted on the brake is dictated by the amount of force exerted on the cable by the operating mechanism, which is a lever system mounted juxtaposition to the foot actuated pedal lever. In view of the direct mechanical force transmission relationship between the operating mechanism and the brake cable, the lever system of the operating mechanism must cause the desired amount of linear movement for the brake operating cable together with the desired amount of final brake applying force exerted on the cable. These two features have resulted in added complexity for the mechanisms which are used to transmit the oscillating movement of the pedal lever to the linear pulling movement of the brake engaging cable. Because of federal regulations or guidelines, it is necessary to apply at least a given pulling force to the cable when the cable has been shifted to the brake engaging position. Also, the pedal must have a certain preselected movement angle. These features, together with the required actual movement of the cable, have resulted in some brake operating mechanisms which require a pumping action for the lever to obtain the desired amount of cable movement with the final amount of brake applying force. Such a system is shown in U.S. Pat. No. 3,184,992. This pumping action is not desirable and efforts have been made to provide an actuating mechanism which creates sufficient linear movement of the cable on a single depression or actuation of the parking brake. These efforts have often involved a lever system wherein the brake engaging cable is connected onto the pivoting pedal lever at a sufficient lever arm distance to provide the desired linear movement of the cable. This type of actuator or operating device presents difficulty at the end of the movement, in that the lever arm necessary to obtain the desired movement is counterproductive to the exertion of a magnified force on the brake actuator as the pedal lever approaches the brake engaging or brake actuating position. Consequently, two features required in an operating mechanism have been working at cross purposes in lever systems heretofore provided for mechanical brake operating devices used in parking brakes and emergency brakes for motor vehicles.

THE INVENTION

The present invention relates to a mechanical operating mechanism for parking or emergency brakes, which mechanism allows the desired linear movement of the brake actuating cable without sacrificing the capability of exerting a magnified force at the brake engaging or actuating portion of the brake pedal movement by a driver of the vehicle.

In accordance with the present invention there is provided a device for pulling upon a parking brake actuating cable in response to movement of a pedal actuated lever, as the lever moves in a selected path between a brake releasing first position and a brake engaging second position. This device comprises a motion translating element having first and second mechanical coupling means spaced from each other for securing the translating element to the lever and brake cable, respectively. The invention also includes means for moving the first mechanical coupling means secured to the translating element in a selected path, which in the preferred embodiment is an arcuate path, as the pedal lever is moved. A cam means coacts with the motion translating element to cause the second mechanical coupling means of the element to move in a selected second path controlled, jointly, by the movement of the first coupling means in the first mentioned path and by the controlling function of the cam means. In this manner, as the first coupling means, connected to the pedal, is moved in an arcuate path, the cam means coacts with the motion translating element to force the second end of this element to move in a preselected controlled path. This structure provides drag link with a variable fulcrum. The cam means causes the drag link to pull the cable at a rapid movement ratio and at a reduced movement ratio. This reduction in the motion or movement ratio between the arcuately moving first end of the drag link and the cam controlled second end of the drag link causes a corresponding increase in the mechanical advantage between the force applied by the pivoted pedal and the force applied to the cable at the brake engaging position of the operating mechanism. By using the drag link concept, wherein the first end of the link is pulled in an arcuate path determined by the pedal and the second end is moved in a controlled path defined by a camming action, both motion and force transmitting functions at the outboard end of the drag link can be controlled by the action of the cam means. This camming action, in the preferred embodiment, is caused by a curvilinear cam plate secured to the drag link and riding or sliding over a fixed, rotating pin. The surface and pin are located intermediate the two ends of the drag link and below the drag link so that force exerted by the cable on the outboard trailing end of the drag link causes a corresponding force to be exerted downwardly by the cam surface against the rotating fixed pin. By this arrangement, the fixed pin forms a fulcrum for the lever system formed by the drag link. This fulcrum slides along the cam surface and progressively changes the lever arm of the motion translating element to increase the lever arm from the fulcrum to the pedal lever engaging end and decrease the distance from the fulcrum to the cable engaging end of the drag link or other motion transmitting element. This progressive changing of the relative lever arms in the system defined by the drag link progressively increases the mechanical advantage defined by the drag link and also decreases the general motion enlarging ratio from the first end of the drag link to the second end of the drag link.

The terms parking brake and emergency brake are used somewhat synonymous in the automotive art. Consequently, the invention is directed to a foot actuated device for mechanically applying the brakes of a motor vehicle irrespective of the designation.

The primary object of the present invention is the provision of a mechanical parking brake control device, which control device allows progressive changing of the output movement and output force as the normal pedal is moved from a brake release position to a brake actuating position.

Another object of the present invention is the provision of a mechanical parking brake control device, as defined above, which device includes a relatively few number of parts in addition to parts normally used and is positive and reliable in operation.

Still a further object of the present invention is the provision of a control device, as defined above, which control device includes a moving fulcrum lever system.

Still a further object of the present invention is the provision of a control device, as defined above, which control device includes a drag link movable over a fixed member to change, progressively, the operating lever system of the device as the pedal is moved toward the brake engaging position.

These and other objects and advantages will become apparent from the description of the preferred embodiment of the invention made in conjunction with the appended drawings which are set forth in the following section.

BRIEF DESCRIPTION OF DRAWINGS

In the present disclosure, the following views are provided.

PREFERRED EMBODIMENT OF THE INVENTION

Figure 1:
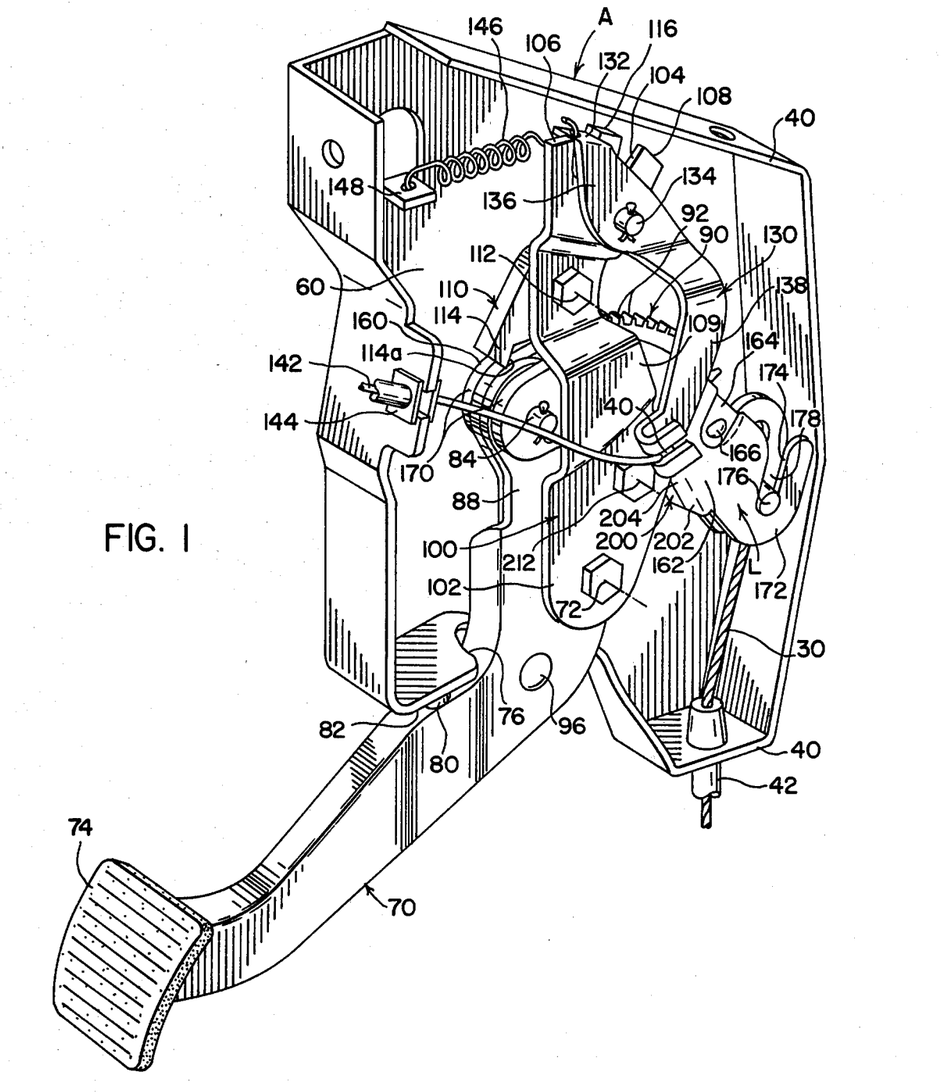
FIG. 1 is a perspective view illustrating the preferred embodiment of the present invention.
Figure 2:
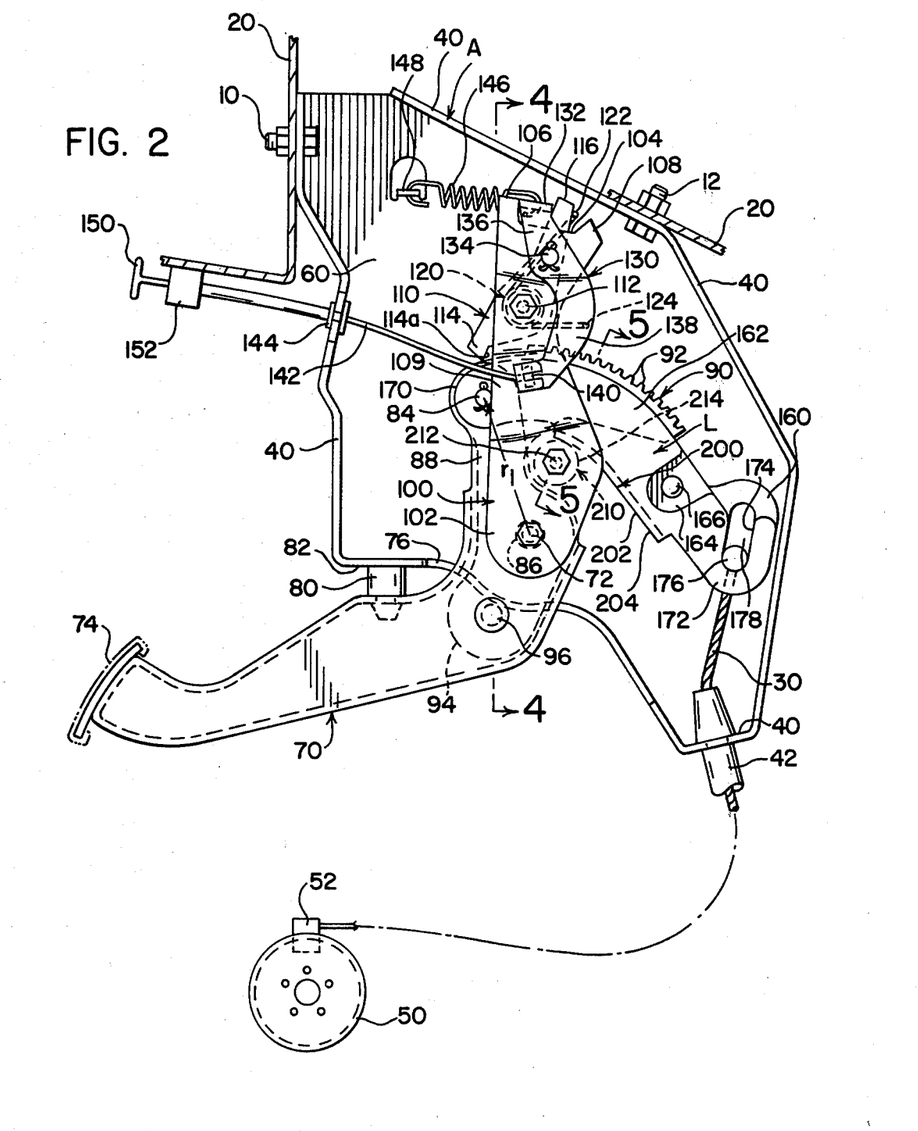
FIG. 2 is a side elevational view showing the preferred embodiment of FIG. 1 with the brake engaging cable in the brake release or rest position and the invention mounted in a motor vehicle.
Figure 3:
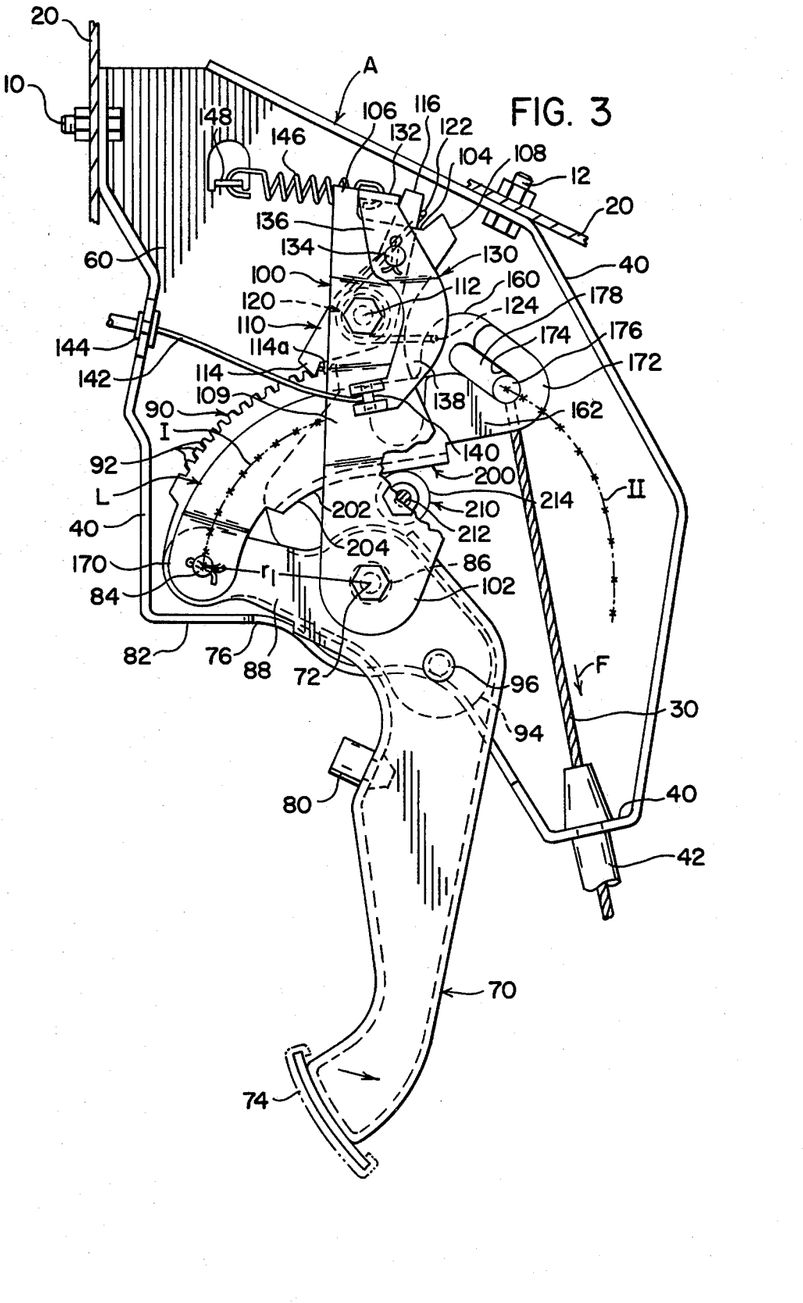
FIG. 3 is an enlarged side elevational view similar to FIG. 2 showing the preferred embodiment with the brake engaging cable in the engaged or actuated position.
Figures 4, 5:
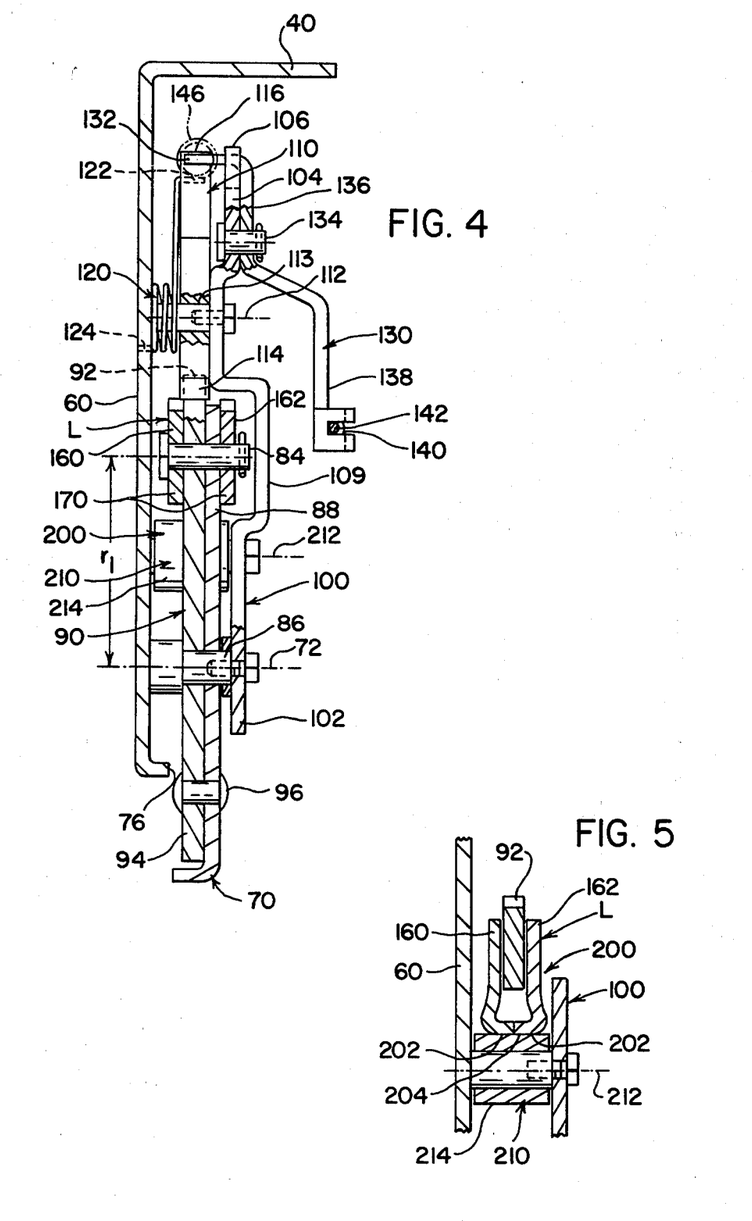
FIG. 4 is an enlarged cross-sectional view taken generally along line 4—4 of FIG. 2.
FIG. 5 is an enlarged cross-sectional view taken generally along line 5—5 of FIG. 2.

Referring now to the drawings wherein the showings are for the purpose of illustrating a preferred embodiment of the invention only, and not for the purpose of limiting same, FIGS. 1–3 show a mechanical parking brake operating mechanism or device A mounted by a plurality of bolts, two of which are shown as bolts 10, 12, onto a motor vehicle cowling 20. Brake operating mechanism A is employed to apply a linear force onto the cable 30 of a standard Bowden cable assembly 42, fixed with respect to device A at peripheral wall 40. Cable 30 is movable upwardly between a brake releasing position to a brake energizing position in a manner so that the cable operates the brakes of a motor vehicle, schematically illustrated as a brake drum 50. This braking mechanism of the vehicle, which may take a variety of forms, is illustrated as including an actuator mechanism 52 which is shifted by upward movement of cable 30 for the purposes of selectively energizing brake 50 in accordance with standard practice. This applies the parking or emergency brake for the motor vehicles. A biasing force F is maintained on cable 30 to force device A into the brake release position. In the illustrated embodiment of the invention, a generally fixed support structure is provided in the form of a sheet metal plate 60 which is surrounded by the previously mentioned peripheral wall 40 so that the lever system constructed in accordance with the preferred embodiment of the invention is fixedly secured with respect to the passenger compartment of a motor vehicle. Main operating lever 70 is pivotally mounted about a fixed axis 72 and is adapted to be pivoted counterclockwise by an operator engaging foot pedal 74, which is on the lower end of lever 70. This lever protrudes through opening 76 in peripheral wall 40. A rubber or resilient stop 80 carried by lever 70 is adapted to engage abutment or shoulder 82 of wall 40 to limit the clockwise movement of lever 70. Counterclockwise movement of lever 70 is limited by the reaction force of cable 30, as it applies or actuates brake 50 of a motor vehicle. When lever 70 is at rest, as shown in FIGS. 1 and 2, cable 30 is protracted and brake 50 is released. Referring now to FIG. 4, lever 70 is pivotally mounted about pin 86 at axis 72. The lever includes an upwardly extending operating arm 88 which carries a movable pivot or pulling pin 84 used as a pulling device for cable 30 as pedal lever 70 is pivoted in a counterclockwise direction. Pin 84 is spaced from axis 72 a distance $r_1$, which determines the applied torque and motion at pin 84 along path I in response to movement of lever 70. As can be seen, pin 84 moves in an arcuate path I through an angle corresponding to the angle of movement of lever 70 since pin 84 is carried directly on lever 70.

Figure 6:
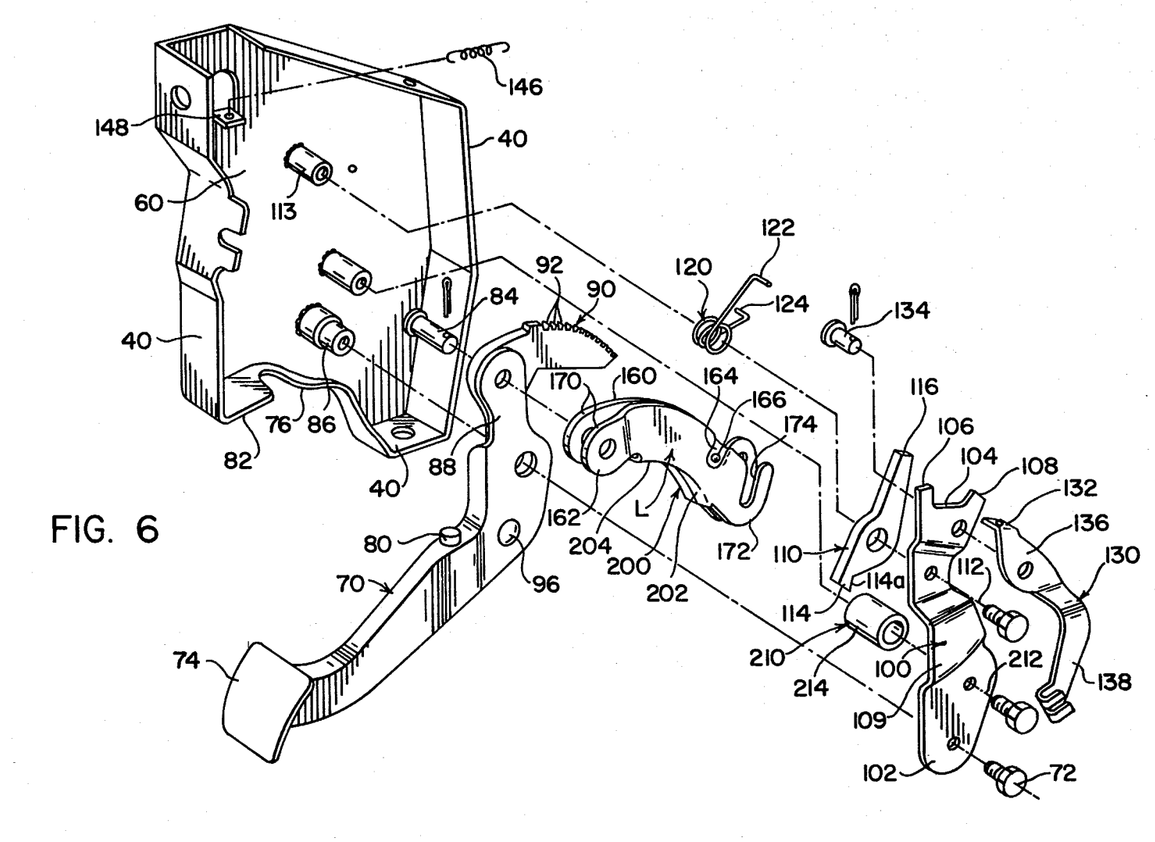
FIG. 6 is an exploded assembly view showing the preferred embodiment of the present invention; and, FIGS. 7, 8 and 9 are schematic views illustrating an operating characteristic of the preferred embodiment of the invention as the control device per mechanism is shifted from the brake release position toward the brake engaging or actuating position from FIG. 7, to FIG. 8, and then to FIG. 9.

A gear sector 90 having teeth 92, formed in an arc concentric with axis 72, is fixedly attached to lever 70. In accordance with the illustrated embodiment, a rivet or welded joint 96 secures support leg 94 of sector 90 onto lever 70. Pin 86 extends through sector 90 to further secure the sector and lever together, as shown in FIG. 4. A fixed plate 100 is provided with a lower end 102 which is attached to pivot pin 86 of lever 70 onto fixed support plate 60. Plate 100 also includes an upper bifurcated end 104 having angularly disposed ears or stops 106, 108. As can be seen in FIGS. 1, 4 and 6, plate 100 has a central, transverse channel area 109 generally aligned with pin 84.

As so far described, lever 70 and gear sector 90 are pivoted in unison about axis 72 by an operator in a motor vehicle. This motor will actuate the parking or emergency brake system in accordance with the present invention and in a manner to be described later. To secure the brake in the engaged condition upon actuation of lever 70, there is provided a pawl 110 pivoted about axis 112 and including a downwardly extending nose 114 behind plate 100, which nose engages teeth 92 of sector 90 to hold the sector in an angular position determined by the movement of lever 70. Pawl 110 is mounted on pin 113 as shown in FIG. 4. Upwardly extending lever portion 116 of pawl 110 is used to bias pawl 110 in locking, counterclockwise position and for moving the pawl in the unlocked or released, clockwise displaced position. To cause the biasing action, there is provided a torsion spring 120, best shown in FIG. 4, having a first end 122 in biasing engagememt with lever portion 116 and a second end 124 engaging fixed support structure or plate 60. In this manner, spring 120 biases pawl 110 in the counterclockwise, locking direction. As lever 70 is actuated, cam portion 114a of nose 114 cams the nose 114 against the action of spring 120 until lever 70 stops. Then spring 120 holds nose 114 into a space between teeth 92 so that lever 70 can not return to its rest position. This locking action can be released manually by a lever 130 having an upper transversely extending keeper 132, best shown in FIG. 4, adapted to engage lever portion 116 of pawl 110. Keeper 132 is on a relatively short leg 136 of lever 130. Lever 130 is pivotally mounted on pin 134 which is fixedly secured to plate 100. To create a higher force against pawl 110 by keeper 132, leg 138 of lever 130 is substantially longer than leg 136. A cable coupling device or member 140 secures cable 142 onto the lower end of lever 130 so that the lever may be pivoted about pin 134 by moving cable 142 to the left in FIG. 2. Cable 142 extends through grommet 144 and lever 130 is biased into engagement with stop ear 106 by an appropriate spring 146 secured to tab 148 of support structure 60. Movement of handle 150 to the left pulls cable 142 through an appropriate device 152. This pivots lever 130 in a clockwise direction forcing lever portion 116 of pawl 110 to the right, as shown in FIG. 3. This releases finger 114 from a locking relationship with a tooth 92 on sector 90 so that the normal spring force pulling cable 30 toward brake actuator 52 will return lever 70 to the brake release position, as shown in FIG. 2. It is appreciated that there can be a one way driving connection between the lower portion of lever 70 and upper arm 88 so that the lower portion of lever 70 can be returned to the position shown in FIG. 2 even though arm 88 is locked in the pivoted, brake engaging position. However, in practice, lever 70 is a single piece and does not have such a one way drive arrangement.

As so far described, the operation of apparatus A does not depart substantially from the operation of known parking or emergency brake actuating or operating mechanisms. Downward movement of the pedal pulls cable 30 to engage or actuate the brakes. Sector 90 is held by pawl 110 to lock the brakes in the actuated position. To release the brakes, handle 150 is actuated or pulled to cam pawl 110 away from sector 90 and allow the brakes to return to the rest position against the spring or biasing action pulling cable 30 downwardly.

In accordance with the present invention, there is provided an improved mechanism for moving cable 30 in response to movement of pin 84 in path I. In accordance with the invention, there is provided a drag link L formed from spaced plates 160, 162 secured at depression area 164 by rivet 166 to sandwich sector 90 therebetween. Link L has a first end 170 defining a first coupling means or members, which means or member is secured onto link pulling pin 84 of arm 88. Thus, first end 170 of link L is pulled in arcuate path I by pin 84 as the pin progressively moves along path I by pedal 74.

Drag link L includes a second end 172 onto which is supported the end of cable 30. Receptacle 174 forms a nest for a cylindrical, transversely extending cable head 176. This head oscillates within receptacle 174 in a cradle fashion to form a pivoted joint at the end of cable 30. Elongated slot 178 in plate 160 limits movement of head 176 in nest or receptacle 174. In this manner, drag link L does not require a clevis, as used in most prior art parking or emergency brake operating devices or mechanisms.

As lever 70 is pivoted by depressing pedal 74, pin 84 pulls link L to the left in the arc defined as path I. This motion also moves second end 172 of link L in a manner to pull cable 30 and actuate the brakes. To control the path of movement of outboard or second end 172, drag link L includes cam means 200 formed from a downwardly facing, curvilinear plate 202 defining a downwardly facing curvilinear surface 204 engaging a fixed, fulcrum pin 210. This pin is in the form of a rotating cylindrical element adapted to rotate about axis 212, which is parallel to axis 72 and is fixed with respect to this axis. Pulling pin 84 allows link L to rotate about an axis parallel to the two fixed axes 72, 212 and draws link L over pin 210 as pulling pin 84 moves along path I in a direction away from axis 212. The outer cylindrical surface 214 of fixed fulcrum pin 210 causes a rolling action along cam surface 204 as drag link L is held against fulcrum pin 210 by the reaction force continuously applied against link L by cable 30.

Figure 7:
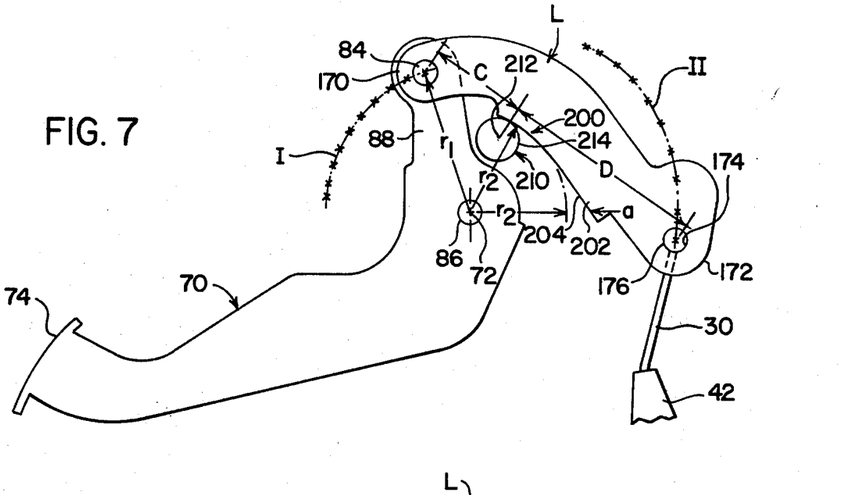
Figure 8:
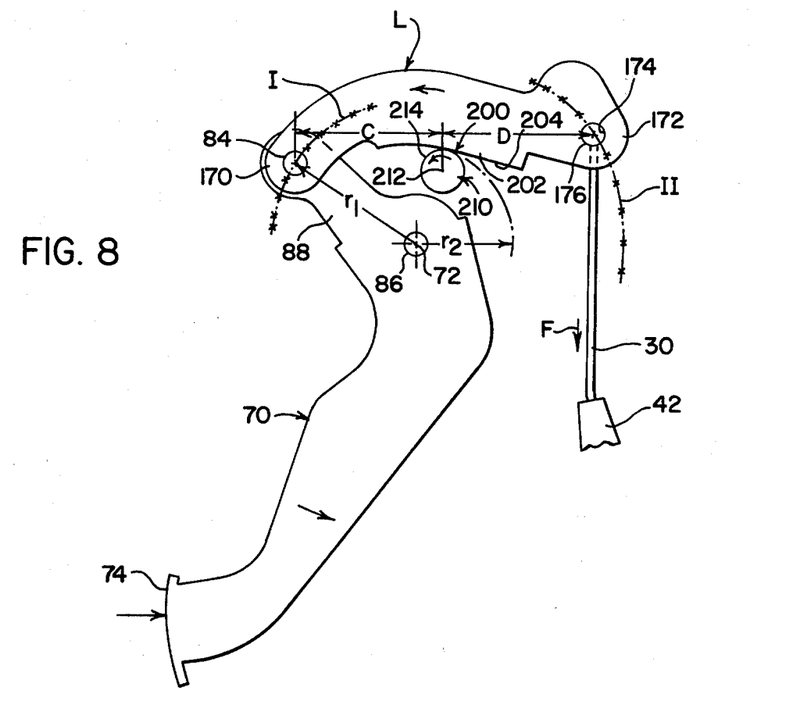
Figure 9:
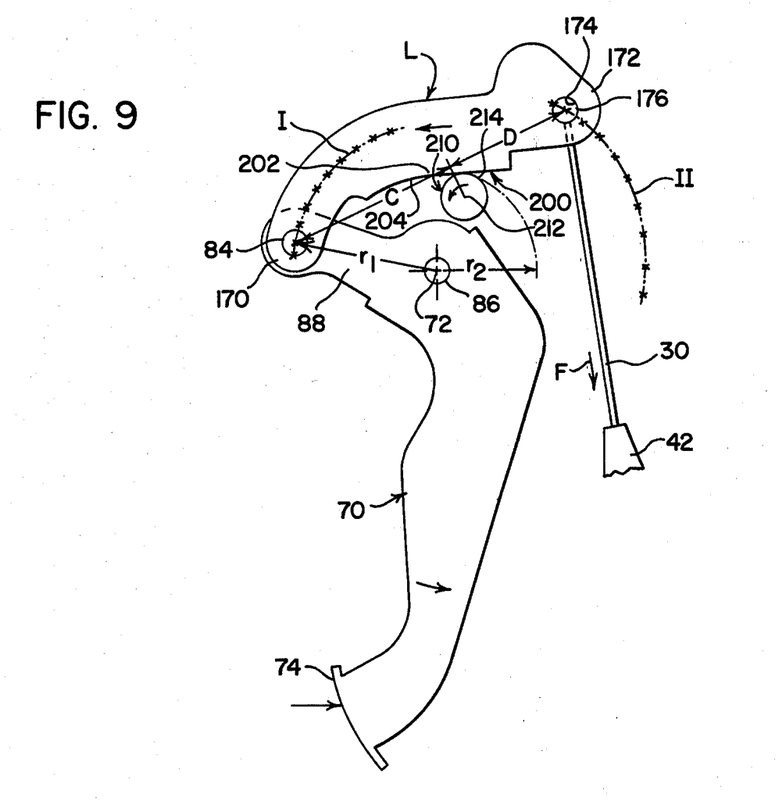

As pin 84 moves progressively to the left along path I, as shown in FIGS. 7–9, lever length C between pin 210 and pin 84 progressively increases while the corresponding lever length D between pin 210 and cable head 176 progressively decreases. Thus, the lever system defined by link L and fulcrum pin 210 progressively changes during movement of pin 84 in arcuate path I. This causes cable head 176 to move in path II, which path is indicated by a plurality of marks corresponding to equal angular spaced X marks in path I. As can be seen, during movement of link L toward the braking position, link L progresses from the position shown in FIG. 7, to the position shown in FIG. 8 and then to the position shown in FIG. 9. The outboard or second end 172 of link L moves rapidly, as illustrated by the large spacing between adjacent marks in path II, and then slowly, as illustrated by smaller spacings between adjacent marks, as the motion ratio is progressively changed due to the operation of cam means 200. Near the end of the brake engaging action, as best shown generally in FIG. 9, plate 202 is substantially straight and very little improvement of cable 30 is accompanied by substantial movement of link pulling pin 84. This small motion ratio increases the mechanical advantage of lever 70 in relationship to cable 30. Thus, at the end of the stroke toward the brake engaging position of lever 70, a large magnification of the force applied to lever 70 occurs at cable 30. Various changes could be made in the contour of surface 204 to provide interactions between the movement of first end 170 and second end 172 as link L progressively shifts fulcrum pin 210 with respect to the curvilinear surface 204. In practice, the left end of surface 204 is somewhat curved and generally matches an arc defined by radius $r_2$ between axis 72 and surface 214. This relationship allows for rapid upward movement of cable 30 during initial movement of pin 84. Thereafter, after approximately 30% to 50% of the stroke for pedal lever 70, as shown in FIG. 8, surface 204 is generally tangential to the arc of radius $r_2$. Spacing a, which is the spacing of terminal end of surface 204 from the arc of radius r₂, can be enlarged to produce a generally sliding final brake application as shown in FIG. 7. However, the contour of surface 204 is such that there is continued movement of cable 30 in the brake applying direction as pin 84 continues to move, even at the end of the braking stroke. This movement can be slight and is controlled by surface 204. In this manner, a large mechanical advantage is obtained at the end of the braking stroke. Other changes could be made in contour of surface 204 so long as the surface is forced against the fulcrum pin and is pulled over the pin 210 by pedal moved pulling pin 84. Also, surface 204 continues to cause pulling of cable 30. Of course, this same motion of second end 172 could be obtained by a cam slot on lever L into which a cam pin would extend. This structure could provide an equivalent type of cam means.

Having thus described the invention, I claim the following:

1. In a parking brake operating mechanism for a vehicle, which mechanism includes a support structure; a pedal actuated lever; means for mounting said lever on said structure to pivot about a fixed axis; a movable force transmitting means for applying an actuating force to a brake actuating element upon movement of said force transmitting means along a preselected path between a brake release position and a brake actuating position; coupling means for connecting said force transmitting means to said pedal actuated lever to move said force transmitting means along said preselected path as said pedal actuated lever is pivoted about said fixed axis; and, means for releasably locking said force transmitting means in said brake actuating position on said path, the improvement comprising: said coupling means comprises a drag link having first and second spaced ends; means for pivotally connecting said first end to said pedal actuated lever on a second axis spaced from said fixed axis whereby said first end of said drag link is moved with said second axis in an arcuate path generally concentric with said fixed axis; means for connecting said force transmitting means onto second end of said drag link; and, cam means for pivoting said drag link about said second axis on said pedal actuated lever as said first end of said drag link is moved in said arcuate path by pivotal movement of said pedal actuated lever.

2. The improvement as defined in claim 1 wherein said cam means includes a member defining a curvilinear surface and a fulcrum member for engaging said curvilinear surface with one of said members being fixed to said drag link and means for fixedly securing the other of said members into said support structure.

3. The improvement as defined in claim 2 wherein said fulcrum member is secured onto said support structure.

4. The improvement as defined in claim 3 wherein said fulcrum member is a cylindrical pin.

5. The improvememt as defined in claim 4 including means for rotatably mounting said cylindrical pin to rotate about a second fixed axis spaced from and generally parallel to said first mentioned fixed axis.

6. The improvement as defined in claim 2 wherein said fulcrum member is a cylindrical pin.

7. The improvement as defined in claim 6 including means for rotatably mounting said cylindrical pin to rotate about a second fixed axis spaced from and generally parallel to said first mentioned fixed axis.

8. The improvement as defined in claim 1 wherein said cam means includes means for reducing the motion ratio of said second end of said drag link with respect to said first end of said drag link at least as said force transmitting means approaches said brake actuating position on said arcuate path.

9. The improvement as defined in claim 8 wherein said cam means includes a member defining a curvilinear surface and a fulcrum member for engaging said curvilinear surface with one of said members being fixed to said drag link and means for fixedly securing the other of said members onto said support structure.

10. The improvement as defined in claim 9 wherein said fulcrum member is a cylindrical pin.

11. A device for pulling upon a parking brake actuating cable in response to pivoting of a pedal actuated lever, said device comprising a drag link pivotally mounted on an axis moved in an arcuate path by said pedal actuated lever between a brake release first position and a brake engaging second position; said drag link having an outboard end spaced from said axis; means for connecting said cable to said outboard end; and, cam means for pivoting said drag link about said arcuately moving axis as said axis moves from said first position toward said second position.

12. A device as defined in claim 11 wherein said cam means includes means for reducing the motion ratio of said outboard end of said drag link with respect to said moving axis as said lever approaches said brake engaging second position.

13. A device for pulling upon a parking brake actuating cable in response to movement of a pedal actuated lever in a selected path between a brake release first position and a brake engaging second position, said device comprising a motion translating element having first and second mechanical coupling means spaced from each other for securing to said lever and said cable, respectively; means for moving said first mechanical coupling means in a selected first path by said lever; and, cam means coacting with said motion translating element for causing said second mechanical coupling means to move in a selected second path controlled jointly by movement of said first coupling means and said cam means.

14. A device as defined in claim 13 wherein said motion translating element is a link and said first and second coupling means are fixedly spaced on said link.

15. A device as defined in claim 13 wherein said cam means includes a curvilinear surface on said motion translating element and a fixed cam member against which said surface is biased by said cable.

16. A device as defined in claim 13 wherein said motion translating element is a link extending between said first and second mechanical coupling means and said cam means is a curvilinear cam surface extending between said first and second coupling means, a fulcrum member engaging said cam surface and means for progressively changing the location of said fulcrum member with respect to said surface as said pedal actuated lever is moved between said first and second positions.

17. A device as defined in claim 16 wherein said location changing means includes means for sliding said surface linearly over said fulcrum member.

18. A device for pulling upon a parking brake actuating cable in response to movement of a lever in a selected path between a brake release first position and a brake engaging second position, said device comprising a drag link pivotally mounted on an axis moved in an arcuate path by said lever; said drag link having an outboard end spaced from said axis; means for connecting said cable to said outboard end; and cam means for pivoting said drag link about said arcuately moving axis as said lever moves from said first position toward said second position.

19. A device as defined in claim 18 wherein said cam means includes means for reducing the motion ratio of said outboard end of said drag link with respect to said moving axis as said lever approaches said brake engaging second position.

20. A device for pulling upon a parking brake actuating cable in response to movement of a lever, said device comprising a motion translating element having first and second mechanical coupling means spaced from each other for securing to said lever and said cable, respectively; means for moving said first mechanical coupling means in a selected first path by said lever; and, cam means coacting with said motion translating element for causing said second mechanical coupling means to move in a selected second path controlled jointly by movement of said first coupling means and said cam means.

21. A device as defined in claim 20 wherein said motion translating element is a link and said first and second coupling means are fixedly spaced on said link.

22. A device as defined in claim 20 wherein said cam means includes a curvilinear surface on said motion translating element and a fixed cam member against which said surface is biased by said cable.

23. A device as defined in claim 20 wherein said motion translating element is a link extending between said first and second mechanical coupling means and said cam means is a curvilinear cam surface extending between said first and second coupling means, a fulcrum member engaing said cam surface and means for progressively changing the location of said fulcrum member with respect to said surface as said actuated lever is moved between said first and second positions.

* * * * *